United States Patent [19]

Prevedello et al.

[11] Patent Number: 4,915,708
[45] Date of Patent: Apr. 10, 1990

[54] FLUIDIFIER ADDITIVES FOR DISPERSIONS OF COAL IN WATER

[75] Inventors: Aldo Prevedello; Carlo Carniani; Armando Marcotullio, all of Milan; Elio Donati, Pesaro, all of Italy

[73] Assignees: Eniricerche S.p.A.; Snamprogetti, S.p.A., both of Milan, Italy

[21] Appl. No.: 265,041

[22] Filed: Oct. 31, 1988

[30] Foreign Application Priority Data

Nov. 13, 1987 [IT] Italy ................................ 22626 A/87

[51] Int. Cl.$^4$ ................................................ C10L 1/32
[52] U.S. Cl. ............................................ 44/90; 44/51
[58] Field of Search ...................... 44/90, 51; 526/932

[56] References Cited

U.S. PATENT DOCUMENTS 4,358,293 11/1982 Mark ........................................ 44/90
4,549,881 10/1985 Mathiesen et al. ...................... 44/90

FOREIGN PATENT DOCUMENTS 161487 9/1984 Japan ...................................... 44/90

Primary Examiner—Carl F. Dees
Attorney, Agent, or Firm—Hedman, Gibson, Costigan & Hoare

[57] ABSTRACT

Storage-stable, pumpable concentrated dispersions of coal in water contain a non ionic additive constituted by the product of polyethoxylation of a styrene-allyl alcohol copolymer having a relatively low molecular weight.

11 Claims, No Drawings

FLUIDIFIER ADDITIVES FOR DISPERSIONS OF COAL IN WATER

The present invention relates to stable and pumpable, concentrated dispersions of coal in water and to a stabilizer and fluidifier additive suitable for that purpose.

At present, energy production is mostly based on the combustion of either liquid or gaseous fuels, such as petroleum and natural gas. The use of coal for such a purposes, meets with difficulties deriving from transport, storage and combustion of said material. Therefore, on considering the large availability of coal, and the large extraction capacity, much effort is being directed to the search for techniques for transforming coal into a more useful energy source. So, e.g., the coal gasification (destructive distillation), as well as coal liquefaction (high-pressure hydrogenation) techniques have been explored.

According to a further technique, coal, in the form of solid particles, is dispersed in a liquid medium in order to form a dispersion, in particular an aqueous dispersion. Relatively to coal as such, such an aqueous dispersion can make it possible considerable technical advantages to be achieved, in that it is easier to store and transport, and with a lower ecological impact on the environment.

Furthermore, providing coal in a liquid form may make it possible same coal to be burnt without a preliminary water separation, on a similar equipment to that used for burning fuel oil.

However, in order to practically achieve such advantages, high-coal-content, homogeneous coal dispersions are required, which are stable (i.e., non-settling) after a certain storage time, as well as fluid and pumpable, in order to make it possible them to be conveyed inside pipes and atomized inside the combustion chamber.

In order to try to fulfil the transport and combustion requirements, it was mostly operated in the art by controlling the size and the distribution of coal particles in the dispersion, and adding to the same dispersions additives capable of providing characteristics of storage stability and pumpability.

The proposed additives belong to several compound classes, e.g.: thickener additives, such as xanthan gum, guar gum derivatives and poly-ethylene-oxide (U.S. Pat. No. 4,242,098); polyelectrolyte dispersant additives, such as ammonium or alkali metal salts of polycarboxy acids, or polyphosphates (U.S. Pat. No. 4,217,109); and non-ionic, polyoxyalkylene surfactant additives (U.S. Pat. No. 4,358,293).

The main drawback of the additives of the prior art consists in their substantial incapability to produce high-coal-content dispersions of coal in water, which are simultaneously stable to storage, and endowed with transport-suitable fluidity values.

Furthermore, various non-ionic polyoxyalkylene additives are unable to produce stable aqueous suspensions, when they are added to coal during the step of wet-grinding of the same coal.

A purpose of the present invention is overcoming the drawbacks affecting the prior art, as they were hereinabove briefly mentioned.

More particularly, a purpose of the present invention is an additive capable of conferring stability (absence of settling) and fluidity (flowability) on aqueous coal dispersions having a high coal content.

A further purpose of the present invention is a process for preparing such a stabilizer and fluidifier additive.

Another purpose of the present invention are the dispersions of coal in water which contain said stabilizer and fluidifier additive.

Still another purpose of the present invention is a process for preparing said dispersions, which comprises the wet-grinding of coal, in the presence of the additive.

Further purposes of the invention will be clear from the following disclosure.

The stabilizer and fluidifier additive, according to the present invention, is the product from the polyethoxylation of a styrene-allyl alcohol copolymer, wherein said copolymer has a weight average molecular weight (as measured by means of viscosity measurements) comprised within the range of from 500 to 5,000, and contains at least two hydroxy groups per molecule, and said polyethoxylation product contains an average of at least 20 condensed units of ethylene oxide per each hydroxy group.

In the preferred form of practical embodiment, said styrene-allyl alcohol copolymer has a weight average molecular weight comprised within the range of from 1,000 to 2,500, and contains from 3 to 8 hydroxy groups per molecule, and the product of polyethoxylation of said copolymer contains on the average from 40 to 250 condensed units of ethylene oxide per each hydroxy group.

Therefore, the stabilizer and fluidifier additive according to the present invention can essentially be represented by the general formula:

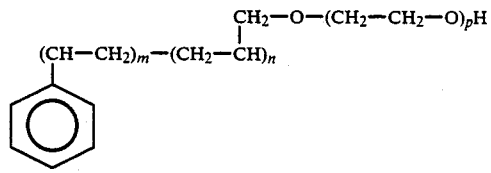

wherein:

m/n is $>1$, and is generally comprised within the range of from 1,2/1 to 8/1; and p is a number equal to, or larger than, 20, and is generally comprised within the range of from 40 to 250.

The styrene-allyl alcohol copolymers are known in the art, and can be prepared by copolymerizing styrene and allyl acetate in the presence of a radicalic initiator in order to obtain a styrene-allyl acetate copolymer, and then hydrolysing the ester groups in order to obtain the styrene-allyl alcohol copolymer, such as disclosed, e.g., by P. Weiss et al. in J. Polym. Sci., XXXV, pages 343–354 (1959).

Styrene-allyl alcohol copolymers, available from the market, suitable for the intended purpose, are those known under the commercial names RF 9266, RJ 101 and RJ 100 by Monsanto, and FILTREZ by FRP Co.

The styrene-allyl alcohol copolymers, having the above stated characteristics, is made react with ethylene oxide to yield the stabilizer and fluidifier additive of the present invention. This reaction is suitably carried out by operating in the absence of solvents or diluents, in the presence of alkaline catalysts, by feeding ethylene oxide to the styrene-allyl alcohol copolymer and maintaining reaction temperatures comprised within the range of from 140° to 180° C.

Basic catalysts suitable for the intended purpose are alkali metal or alkali-earth metal oxides, hydroxides and alkoxides.

Among these, the alkali-metal hydroxides, in particular potassium hydroxide, are preferred. The amount of catalyst may be comprised within the range of from 0.1 to 2.0 parts by weight per each 100 parts by weight of styrene-allyl alcohol copolymer.

The ratio of the reactants to each other depends on the amount of ethylene oxide which one wants to link to each hydroxy group present in the styrene-allyl alcohol copolymer, considering that, under the above stated conditions, the reaction proceeds up to completion, or substantial completion, within a time of the order of 2-4 hours.

Finally, the reaction mass is cooled, and the stabilizer and fluidifier additive is recovered and can be used as such, with no need for any further purifications.

The so-obtained additive is a water-soluble solid.

It should be observed that P. Weiss et al. (hereinabove cited) described at page 352 of their paper the formation of adducts of ethylene oxide and a styrene-allyl alcohol copolymer. However, these adducts, with a low content of polyethylene-oxide moiety, and with characteristics of non-ionic surfactants, are not useful for the purposes of the present invention.

According to a further aspect, the present invention relates to aqueous dispersions of coal containing the above disclosed additive. More particularly, said dispersions can contain from 60 to 75% by weight of coal solids with a particle size generally equal to, or lower than, 300 μm, and from 0.3 to 0.9% by weight of the stabilizer and fluidifier additive according to the present invention, with the residual percentage being constituted by water.

In the preferred form of practical embodiment, the coal solids are contained in an amount of the order of from 68 to 72% by weight, and the additive content is comprised within the range of from about 0.4 to 0.7% by weight.

The aqueous dispersions of coal solids can be prepared by means of the normal processes known in the art. However, in a preferred form of practical embodiment, the dispersions are prepared by means of a process which comprises the following treatments:

(a) pre-grinding of coal under dry conditions in order to produce a pre-ground coal with a maximum particle size of about 6 mm;

(b) wet grinding of a portion of the pre-ground coal, carried out in the presence of the stabilizer and fluidifier additive, in order to produce an aqueous dispersion of micronized coal solids, with an average size of the particles of the order of from 6 to 12 μm;

(c) addition of the residual portion of pre-ground coal to said dispersion, and obtainment of the resulting dispersion with a finishing mill, possibly followed by a step of homogenization on said mixer.

In the preparation of the dispersions of the present invention, any types of coal can be used, whether of low or of high quality, sub-bituminous or bituminous coals, anthracite, possibly submitted to preliminary treatments having the purpose of removing the inerts (beneficiation).

In any case, aqueous dispersions are obtained, with a high solid content, which are stable to storage for industrially useful time periods, and are fluid enough to make it possible them to be conveyed by pumping through pipes.

The following experimental examples are illustrative and non-limitative of the purview of the present invention.

EXAMPLE 1

Preparation of the Fluidifier-Stabilizer Additive

In the preparation of the fluidifier and stabilizer additive, two different styrene-allyl alcohol copolymers are used, and, in particular:

A. A styrene-allyl alcohol copolymer supplied by the company Polysciences, having a weight average molecular weight of 1,150 and a content of hydroxy groups of 7.5% by weight.

B. A styrene-allyl alcohol copolymer supplied by the company Polysciences, having a weight average molecular weight of 1,500 and a content of hydroxy groups of 6.0% by weight.

The additive is prepared by means of the following general procedure.

To an autoclave of 1 liter of capacity, equipped with a magnetic-drive stirrer and provided with inlets for ethylene oxide and nitrogen, thermometer sheath, pressure gauge and safety valve, a styrene-allyl alcohol copolymer, selected from between the two above-stated copolymers, is charged, together with potassium hydroxide (titre 86%) as a finely ground solid, and in an amount of 1-1.2 parts by weight per each 100 parts by weight of styrene-allyl alcohol copolymer.

The autoclave is sealed, is purged with nitrogen and is stirred, while the temperature is increased up to about 150° C. Over a time of the order of about 120 minutes, ethylene oxide is fed into the autoclave, in an amount corresponding to that which one wants to link to the hydroxy groups of the copolymer. During this time interval, a temperature increase up to values of the order of 165°-175° C. is observed. At the end of the addition of ethylene oxide, the reaction is allowed to proceed for a further time of about 60 minutes. The autoclave is then cooled and the reaction product is recovered and is used, without any further treatments, as an additive for the suspensions of coal in water.

In these reactions, the yield, evaluated relatively to fed ethylene oxide, has always been higher than 99%, and the following additives have been prepared, for which the average number of reacted ethylene oxide molecules per each hydroxy group of the styrene-allyl alcohol copolymer used is reported:

| Additive | Ethylene Oxide/Hydroxy Groups Ratio |
| --- | --- |
| A-1 | 115/1 |
| A-2 | 155/1 |
| A-3 | 90/1 |
| A-4 | 180/1 |
| A-5 | 70/1 |
| A-6 | 40/1 |
| B-1 | 155/1 |
| B-2 | 115/1 |
| B-3 | 90/1 |
| B-4 | 180/1 |
| B-5 | 250/1 |

The additives from A-1 to A-6 derive from the styrene-allyl alcohol copolymer as hereinabove indicated as the (A) copolymer, and the additives from B-1 to B-5 derive from the styrene-allyl alcohol copolymer as above indicated as the (B) copolymer.

In order to evaluate the above additives, concentrated aqueous dispersions of coal are prepared, which contain one of the above mentioned additives, and viscosity measurements are carried out, at several speed gradients, by means of the HAAKE RV 12 rotational viscometer, equipped with an MVI sensor and an M 500 measurement head.

More particularly, inside a beaker of 200 ml of capacity, 70 g is weighed of a coal sample, ground down to a granulometry lower than 250 μm. An aqueous solution of the additive being tested is then added, so as to have total amounts:

of coal: of 68–70% by weight; of additive: of 0.5% by weight; water: Balance to 100%.

The mass is submitted to stirring by means of a stirrer equipped with two metal whips, for 1 minute at 650 rpm, and for 2 minutes at 1,200 rpm.

The so-obtained dispersion is introduced into the outer measurement cylinder of the viscometer, is maintained at the controlled temperature of 20° C., and after a stay time of 3 minutes, the values of the shear stress are measured at various speed gradients (from 0 to 150 sec$^{-1}$).

The so-obtained experimental values are processed with the aid of the OSTWALD's power equation:

$$\tau = K \cdot \dot{\gamma}^n$$

wherein:
$\tau$ = shear stress (Pa)
K = consistency index (Pa·sec$^n$)
$\dot{\gamma}$ = speed gradient (sec$^{-1}$)
n = Newtonian behaviour index and with the aid of the BINGHAM's power equation:

$$\tau = \tau_0 + \dot{\gamma}\eta_B$$

wherein:
$\tau$ = shear stress (Pa)
$\tau_0$ = flowing threshold (Pa)
$\dot{\gamma}$ = speed gradient (sec$^{-1}$)
$\eta_B$ = plastic viscosity (Pa·sec)

For each couple of values $\tau$ and $\dot{\gamma}$, the values of K and n (OSTWALD's equation) and of $\tau_0$ and $\eta_B$ (BINGHAM's equation) are computed by linear regression, which are reported in the following tables. Furthermore, in said tables, the values of apparent viscosity ($\eta_{app}$) are reported as Pa·sec, at 30, 60, 100 and 150 sec$^{-1}$.

EXAMPLE 2

A Columbian coal is used, which shows the following analysis (referred to dry matter):

Volatile substances: 36.11%; ashes: 9.69%; fixed carbon (by difference): 54.21% by weight.

This coal is ground down to the following end granulometry:

| μm | Retained matter, % |
|---|---|
| 1 | 96 |
| 2 | 91 |
| 3 | 87 |
| 4 | 82.5 |
| 6 | 76.5 |
| 8 | 72.1 |
| 10 | 68 |
| 16 | 59.9 |
| 24 | 50.5 |
| 32 | 44 |
| 48 | 35 |
| 64 | 28 |
| 96 | 19 |
| 126 | 12 |
| 180 | 7.5 |
| 192 | 3.0 |
| 250 | 0.0 |

According to the above reported methodology, dispersions are prepared, which contain 68.5% by weight of ground coal, and 0.5% by weight of additive, with the balance to 100% being water. The results of the evaluation of these dispersions are reported in Table 1.

EXAMPLE 3

A Polish coal is used, which shows the following analysis (referred to dry matter):

Volatile substances: 30.5%; ashes: 9.87%; fixed carbon (by difference): 59.98% by weight.

This coal is ground down to the end granulometry according to as described in Example 2.

According to the above reported methodology, dispersions are prepared, which contain 70% by weight of ground coal, and 0.5% by weight of additive, with the balance to 100% being water. The results of the evaluation of these dispersions are reported in Table 2.

EXAMPLE 4

A Russian coal is used, which shows the following analysis (referred to dry matter):

Volatile substances: 37.63%; ashes: 15.32%; fixed carbon (by difference): 47.05% by weight.

This coal is ground down to the end granulometry according to as described in Example 2.

According to the above reported methodology, dispersions are prepared, which contain 68% by weight of ground coal, and 0.5% by weight of additive, with the balance to 100% being water. The results of the evaluation of these dispersions are reported in Table 3.

EXAMPLE 5

A South-African coal is used, which shows the following analysis (referred to dry matter):

Volatile substances: 28.95%; ashes: 12.94%; fixed carbon (by difference): 58.11% by weight.

This coal is ground down to the end granulometry according to as described in Example 2.

According to the above reported methodology, dispersions are prepared, which contain 70% by weight of ground coal, and 0.5% by weight of additive, with the balance to 100% being water. The results of the evaluation of these dispersions are reported in Table 4.

TABLE 1

| Test Nr. | Additive | OSTWALD n | OSTWALD K | BINGHAM $\tau_0$ | BINGHAM $\eta_B$ | $\eta_{app}$ (30 sec$^{-1}$) | $\eta_{app}$ (60 sec$^{-1}$) | $\eta_{app}$ (100 sec$^{-1}$) | $\eta_{app}$ (150 sec$^{-1}$) |
|---|---|---|---|---|---|---|---|---|---|
| 1 | A-6 | 0.822 | 0.693 | 4.2 | 0.259 | 375 | 339 | 308 | 276 |
| 2 | A-5 | 0.930 | 0.445 | 1.7 | 0.303 | 348 | 335 | 325 | 308 |
| 3 | A-3 | 0.854 | 0.759 | 3.8 | 0.251 | 347 | 326 | 300 | 260 |

TABLE 1-continued

| Test Nr. | Additive | OSTWALD n | OSTWALD K | BINGHAM $\tau_o$ | BINGHAM $\eta_B$ | $\eta_{app}$ (30 sec$^{-1}$) | $\eta_{app}$ (60 sec$^{-1}$) | $\eta_{app}$ (100 sec$^{-1}$) | $\eta_{app}$ (150 sec$^{-1}$) |
|---|---|---|---|---|---|---|---|---|---|
| 4 | A-1 | 0.793 | 0.928 | 6.2 | 0.288 | 448 | 405 | 360 | 310 |
| 5 | A-2 | 0.835 | 0.728 | 4.9 | 0.284 | 405 | 380 | 348 | 298 |
| 6 | A-4 | 0.912 | 0.498 | 2.3 | 0.302 | 371 | 358 | 336 | 298 |
| 7 | B-3 | 0.842 | 0.571 | 4.12 | 0.229 | 327 | 311 | 284 | 240 |
| 8 | B-2 | 0.764 | 0.671 | 4.3 | 0.178 | 310 | 240 | 260 | 225 |
| 9 | B-1 | 0.830 | 0.736 | 5.1 | 0.279 | 405 | 380 | 343 | 298 |
| 10 | B-4 | 0.823 | 0.759 | 5.4 | 0.272 | 405 | 384 | 345 | 288 |
| 11 | B-5 | 0.849 | 0.577 | 3.4 | 0.289 | 374 | 355 | 332 | 298 |

TABLE 2

| Test Nr. | Additive | OSTWALD n | OSTWALD K | BINGHAM $\tau_o$ | BINGHAM $\eta_B$ | $\eta_{app}$ (30 sec$^{-1}$) | $\eta_{app}$ (60 sec$^{-1}$) | $\eta_{app}$ (100 sec$^{-1}$) | $\eta_{app}$ (150 sec$^{-1}$) |
|---|---|---|---|---|---|---|---|---|---|
| 1 | A-6 | 0.865 | 0.679 | 3.3 | 0.329 | 429 | 388 | 363 | 347 |
| 2 | A-5 | 0.873 | 0.680 | 3.5 | 0.339 | 437 | 400 | 380 | 352 |
| 3 | A-3 | 0.781 | 0.933 | 6.7 | 0.265 | 420 | 401 | 345 | 290 |
| 4 | A-1 | 0.835 | 0.879 | 5.4 | 0.351 | 494 | 452 | 416 | 373 |
| 5 | A-2 | 0.789 | 1.162 | 7.9 | 0.350 | 536 | 503 | 442 | 378 |
| 6 | A-4 | 0.832 | 0.754 | 3.5 | 0.307 | 428 | 386 | 353 | 312 |
| 7 | B-3 | 0.814 | 0.807 | 5.5 | 0.280 | 418 | 386 | 350 | 295 |
| 8 | B-2 | 0.768 | 1.120 | 8.1 | 0.295 | 483 | 443 | 397 | 318 |
| 9 | B-1 | 0.828 | 0.986 | 6.3 | 0.375 | 536 | 497 | 450 | 398 |
| 10 | B-4 | 0.794 | 0.993 | 7.3 | 0.303 | 480 | 445 | 395 | 325 |
| 11 | B-5 | 0.862 | 0.813 | 4.5 | 0.380 | 505 | 469 | 437 | 400 |

TABLE 3

| Test Nr. | Additive | OSTWALD n | OSTWALD K | BINGHAM $\tau_o$ | BINGHAM $\eta_B$ | $\eta_{app}$ (30 sec$^{-1}$) | $\eta_{app}$ (60 sec$^{-1}$) | $\eta_{app}$ (100 sec$^{-1}$) | $\eta_{app}$ (150 sec$^{-1}$) |
|---|---|---|---|---|---|---|---|---|---|
| 1 | A-6 | 0.733 | 1.735 | 7.5 | 0.431 | 690 | 540 | 504 | 485 |
| 2 | A-5 | 0.819 | 1.174 | 5.0 | 0.458 | 630 | 540 | 508 | 496 |
| 3 | A-3 | 0.737 | 1.688 | 6.4 | 0.415 | 687 | 556 | 503 | 467 |
| 4 | A-1 | 0.673 | 2.28 | 10.6 | 0.394 | 714 | 569 | 529 | 450 |
| 5 | A-2 | 0.578 | 3.611 | 9.55 | 0.441 | 740 | 570 | 526 | 512 |
| 6 | A-4 | 0.720 | 1.935 | 7.4 | 0.451 | 700 | 595 | 527 | 486 |
| 7 | B-3 | 0.686 | 2.116 | 9.9 | 0.392 | 720 | 560 | 495 | 463 |
| 8 | B-2 | 0.670 | 2.41 | 8.93 | 0.638 | 770 | 610 | 523 | 480 |
| 9 | B-4 | 0.772 | 1.578 | 8.4 | 0.462 | 712 | 610 | 550 | 506 |
| 10 | B-5 | 0.637 | 2.94 | 15.6 | 0.384 | 796 | 682 | 557 | 470 |

TABLE 4

| Test Nr. | Additive | OSTWALD n | OSTWALD K | BINGHAM $\tau_o$ | BINGHAM $\eta_B$ | $\eta_{app}$ (30 sec$^{-1}$) | $\eta_{app}$ (60 sec$^{-1}$) | $\eta_{app}$ (100 sec$^{-1}$) | $\eta_{app}$ (150 sec$^{-1}$) |
|---|---|---|---|---|---|---|---|---|---|
| 1 | A-6 | 0.731 | 1.205 | 6.96 | 0.274 | 483 | 399 | 350 | 310 |
| 2 | A-5 | 0.820 | 0.787 | 4.08 | 0.303 | 426 | 375 | 345 | 320 |
| 3 | A-3 | 0.786 | 0.934 | 3.38 | 0.317 | 427 | 378 | 355 | 333 |
| 4 | A-1 | 0.766 | 1.049 | 6.47 | 0.285 | 468 | 410 | 362 | 315 |
| 5 | A-2 | 0.704 | 1.520 | 9.3 | 0.288 | 534 | 460 | 390 | 330 |
| 6 | A-4 | 0.808 | 0.869 | 3.37 | 0.325 | 430 | 393 | 366 | 335 |
| 7 | B-3 | 0.756 | 0.906 | 5.59 | 0.233 | 357 | 358 | 315 | 276 |
| 8 | B-2 | 0.744 | 1.065 | 6.71 | 0.254 | 441 | 385 | 331 | 284 |
| 9 | B-1 | 0.785 | 0.973 | 6.19 | 0.293 | 465 | 410 | 370 | 320 |
| 10 | B-4 | 0.778 | 0.868 | 5.67 | 0.249 | 398 | 358 | 315 | 276 |
| 11 | B-5 | 0.837 | 0.770 | 4.03 | 0.320 | 436 | 395 | 366 | 340 |

In Tables from 1 to 4, the values of the apparent viscosity ($\eta_{app}$) of the dispersions are reported as mPa·s at such various speed gradients as shown. From these viscosity values, one can deduce that the non-ionic additive, according to the present invention, is a good fluidifier for all types of used coal.

EXAMPLE 6

The Polish coal of Example 3 is submitted to a treatment of dry pre-grinding in order to obtain granules having a maximum size of 3 mm.

A mixture of said pre-ground coal (52.6% by weight), water (46.4% by weight) and B-2 additive (1.0% by weight) is then prepared.

This mixture is wet-ground, by using the following grinding charge:
3.2 kg of AISI 420 steel balls, diameter=31.75 mm
4.8 kg of AISI 420 steel balls, diameter=25.40 mm
3.2 kg of AISI 420 steel balls, diameter=12.70 mm
4.8 kg of AISI 420 steel balls, diameter=9.53 mm
and a mill having the inner dimensions of 240×203 mm.

1.8 kg of the mixture having the above reported composition is ground, at a revolution speed of the jar of 70 rpm.

The grinding is carried out batchwise for 2 hours, until the average diameter of coal particles is reduced down to 8.4 μm.

On the so-obtained dispersion, the characteristics are measured, which are reported in Table 5.

EXAMPLE 7

The test is carried out as in Example 6, by using B-3 additive. An aqueous dispersion is obtained, wherein the average diameter of coal particles is of 8.4 μm; the characteristics of said dispersion are reported in Table 5.

EXAMPLE 8

The test is carried out as in Example 6, by using A-6 additive. An aqueous dispersion is obtained, wherein the average diameter of coal particles is of 7.9 μm; the characteristics of said dispersion are reported in Table 5.

EXAMPLE 9

The test is carried out as in Example 6, by using A-1 additive. An aqueous dispersion is obtained, wherein the average diameter of coal particles is of 8.3 μm; the characteristics of said dispersion are reported in Table 5.

TABLE 5

| Test Nr. | OSTWALD K | n | BINGHAM $\tau_o$ | $\eta_B$ | $\eta_{app}$ (30 sec$^{-1}$) | $\eta_{app}$ (100 sec$^{-1}$) | $\eta_{app}$ (150 sec$^{-1}$) |
|---|---|---|---|---|---|---|---|
| 6 | 2.21 | 0.516 | 6.15 | 0.181 | 385 | 240 | 223 |
| 7 | 0.669 | 0.627 | 2.0 | 0.103 | 170 | 121 | 118 |
| 8 | 0.485 | 0.749 | 2.0 | 0.132 | 200 | 150 | 148 |
| 9 | 0.423 | 0.735 | 2.0 | 0.103 | 175 | 120 | 116 |

From the data of Table 5, one can observe that the additive according to the present invention, used during the grinding step, makes it possible aqueous dispersions of micronised coal to be obtained, which are stable and fluid enough.

These dispersions can be blended with pre-ground coal, preferably with a ratio of micronized coal to pre-ground coal by weight, of the order of 40/60, and the resulting blend can be submitted to a finishing step by treating it on a pin mill for a few minutes, with a subsequent step of homogenization inside a mixer.

In this way, concentrated aqueous dispersions of coal solids are obtained, which are homogeneous, stable and fluid.

We claim:

1. Dispersions of coal in water, comprising from 60 to 75% by weight of coal solids with a particle size generally equal to, or lower than, 300 μm, and from 0.3 to 0.9% by weight of an additive, wherein said additive is the product of the poly-ethoxylation of a styrene-allyl alcohol copolymer, wherein said copolymer has an average molecular weight comprised within the range of from 500 to 5,000, and contains at least two hydroxy groups per molecule, and said poly-ethoxylation product contains an average of at least 20 condensed units of ethylene oxide per hydroxy group with the residual percentage being water.

2. Dispersions according to claim 1, characterized in that the coal solids are contained in an amount of the order of from 68 to 72% by weight, and the additive is contained in an amount comprised within the range of from about 0.4 to 0.7% by weight.

3. Process for preparing a dispersion of coal solids in water, comprising the following treatments:
   (a) pre-grinding of coal under dry conditions in order to produce a pre-ground coal with a maximum particle size of about 6 mm;
   (b) wet grinding of a portion of the pre-ground coal, carried out in the presence of an additive, wherein said additive is the product from the poly-ethoxylation of a styrene-allyl alcohol copolymer, wherein said copolymer has a weight average molecular weight comprised within the range of from 500 to 5,000, and contains at least two hydroxy groups per molecule, and said poly-ethoxylation product contains an average of at least 20 condensed units of ethylene oxide per hydroxy group with the residual percentage being water, in order to produce an aqueous dispersion of micronized coal solids, with an average size of the particles of the order of from 6 to 12 μm;
   (c) addition of the residual portion of pre-ground coal to said dispersion, and homogenizing of the resulting dispersion, and improvement of the resulting dispersion by homogenization of a suitable mixer.

4. The dispersion of coal according to claim 1, wherein said copolymer has an average molecular weight comprised within the range of from 1,000 to 2,500.

5. The dispersion of coal according to claim 1, wherein said copolymer contains at least 3–8 hydroxy groups per molecule.

6. The dispersion of coal according to claim 1, wherein said poly-ethoxylation product contains an average of from 40–250 condensed units of ethylene oxide per hydroxide group.

7. The dispersion of coal according to claim 1 wherein, said copolymer has an average molecular weight comprised within the range of from 1,000 to 2,500 and contains at least 3–8 hydroxy groups per molecule and said poly-ethoxylation product contains an average of from 40 to 250 condensed units of ethylene oxide per hydoxide group, with the residual percentage being water.

8. The process for preparing a dispersion of coal according to claim 3 wherein said copolymer of step (b) has an average molecular weight comprised within the range of from 1,000 to 2,500.

9. The process of preparing a dispersion of coal according to claim 3, wherein said copolymer of step (b) contains at least 3–8 hydroxy groups per molecule.

10. The process for preparing a dispersion of coal according to claim 3 wherein said poly-ethoxylation product of Step (b) contains an average of from 40–250 condensed units of ethylene oxide per hydroxide group.

11. The process for preparing a dispersion of coal according to claim 3 wherein said copolymer of Step (b) has an average molecular weight comprised within the range of from 1,000 to 2,500 and contains at least 3–8 hydroxy groups per molecule and said poly-ethoxylation product of Step (b) contains an average of from 40–250 condensed units of ethylene oxide per hydroxide group, with the residual percentage being water.

* * * * *